US011075915B2

United States Patent
Mallis et al.

(10) Patent No.: US 11,075,915 B2
(45) Date of Patent: Jul. 27, 2021

(54) SYSTEM AND METHOD FOR SECURING COMMUNICATION BETWEEN DEVICES ON A NETWORK

(71) Applicant: SECURING SAM LTD., Tel Aviv (IL)

(72) Inventors: Omri Mallis, Tel Aviv (IL); Eilon Lotem, Tel Aviv (IL); Roy Zarchi, Tel Aviv (IL)

(73) Assignee: SECURING SAM Ltd., Tel Aviv (IL)

( * ) Notice: Subject to any disclaimer, the term of this patent is extended or adjusted under 35 U.S.C. 154(b) by 116 days.

(21) Appl. No.: 16/236,674

(22) Filed: Dec. 31, 2018

(65) Prior Publication Data
US 2019/0207948 A1    Jul. 4, 2019

Related U.S. Application Data

(60) Provisional application No. 62/612,473, filed on Dec. 31, 2017.

(51) Int. Cl.
*H04L 29/06* (2006.01)
*H04L 12/24* (2006.01)

(52) U.S. Cl.
CPC ........... *H04L 63/102* (2013.01); *H04L 63/02* (2013.01); *H04L 63/0876* (2013.01); *H04L 63/20* (2013.01); *H04L 41/08* (2013.01)

(58) Field of Classification Search
None
See application file for complete search history.

(56) References Cited

U.S. PATENT DOCUMENTS

| | | |
|---|---|---|
| 5,886,643 A | 3/1999 | Diebboll et al. |
| 7,317,693 B1 | 1/2008 | Roesch et al. |
| 7,761,918 B2 | 7/2010 | Gula et al. |
| 2003/0212908 A1* | 11/2003 | Piesco ............... H04L 41/08 726/25 |
| 2004/0090972 A1 | 5/2004 | Barrett et al. |
| 2006/0050681 A1* | 3/2006 | Monteiro ......... H04L 41/0886 370/352 |
| 2011/0185055 A1 | 7/2011 | Nappier et al. |
| 2012/0291098 A1* | 11/2012 | Janakiraman ..... H04L 12/4641 726/3 |
| 2013/0016628 A1* | 1/2013 | Bertani ............. H04L 41/046 370/255 |

(Continued)

OTHER PUBLICATIONS

Christopher J Tengi et al, "autoMAC: A Tool for Automating Network Moves, Adds, and Changes", USENIX, (Sep. 8, 2004), pp. 113-120, XP061012120.

(Continued)

*Primary Examiner* — William J. Goodchild
(74) *Attorney, Agent, or Firm* — Pearl Cohen Zedek Latzer Baratz LLP (57) ABSTRACT

Methods and systems for securing data communication between devices in a computer network may include receiving a communication request between at least one device and the computer network, validating the at least one device based on the communication request and based on at least one first communication rule, and restricting communication of devices with validated data to at least one virtual network within the computer network, wherein the at least one first communication rule comprises device parameters for allowed connectivity.

19 Claims, 5 Drawing Sheets

(56) References Cited

U.S. PATENT DOCUMENTS

2017/0013544 A1* 1/2017 Chu ..................... H04W 48/14

OTHER PUBLICATIONS

Minlan Yu et al, "A survey of virtual LAN usage in campus networks", IEEE Communications Magazine, IEEE Service Center, Piscataway, US, (Jul. 1, 2011), vol. 49, No. 7, doi:10.1109/MCOM.2011.5936161, ISSN 0163-6804, pp. 98-103, XP011357612.
European Search Report of Application No. EP 18216006 dated Feb. 19, 2019.

* cited by examiner

SYSTEM AND METHOD FOR SECURING COMMUNICATION BETWEEN DEVICES ON A NETWORK

CROSS REFERENCE TO RELATED APPLICATION

This application claims priority of Provisional Application No. 62/612,473, filed Dec. 31, 2017, the entire contents of which are incorporated herein by reference in their entireties.

FIELD OF THE INVENTION

The present invention relates to data communication in a computer network. More particularly, the present invention relates to systems and methods for securing data communication between devices on a computer network.

BACKGROUND OF THE INVENTION

In most household computer networks today, all connected devices (e.g., computers, smartphones, etc.) share the same local area network (LAN), thereby allowing all devices to communicate without restrictions with one another. With increase in technological complexity of home networks and as more devices are being connected, the security implications of such unrestricted environment are overreaching.

In some organizations, computer networks are segmented into different virtual LANs, or VLANs (for example via IEEE 802.1Q standard), such that the network administrator is able to apply access restrictions between different VLANs, usually assigning different VLANs to different physical areas (e.g., different floors in a building). Configuring VLANs is usually a manual process, and configuring each device separately is cumbersome and rarely done and therefore implementing network segmentation correctly without affecting the connected devices performance requires deep understanding of computer networks and protocols. For this reason, it is common in currently deployed household routers to provide two completely separate networks, a 'normal' network and a 'guest' network. The homeowner (e.g., the main user of a home computer network) has no control as to which device connects to which network after the first configuration. For example, once someone connects to the 'normal' network, they can continue doing so without restriction at any time later. Moreover, the two networks ('normal' and 'guest') are completely separated, meaning that the 'guest' network is unsuitable for many types of connected home devices.

SUMMARY OF THE INVENTION

There is thus provided, in accordance with some embodiments of the invention, a method of securing data communication between devices in a computer network, the method including: receiving, by at least one processor, a communication request between at least one device and the computer network, validating, by the at least one processor, the at least one device based on the communication request and based on at least one first communication rule, and restricting communication of devices with validated data to at least one virtual network within the computer network. In some embodiments, the at least one first communication rule may include device parameters for allowed connectivity.

In some embodiments, communication permissions may be assigned to each validated device, wherein the communication of devices may be restricted in accordance with the assigned communication permissions. In some embodiments, communication between devices assigned to different virtual networks may be based on restrictive firewall rules. In some embodiments, the at least one virtual network may be automatically generated within the computer network based on the assigned communication permissions.

In some embodiments, the model of the at least one device may be identified, and communication of devices with validated identification data may be restricted to at least one virtual network within the computer network based on at least one second communication rule, wherein the at least one second communication rule may include model parameters for allowed connectivity. In some embodiments, the at least one second communication rule may include parameters for allowed connectivity selected from the group consisting of: device model, device manufacturer, firmware version and media access control (MAC) address. In some embodiments, each new device may be restricted to a dedicated virtual network until the new device is validated.

There is thus provided, in accordance with some embodiments of the invention, a system for securing data communication between devices in a computer network, the system including: at least one processor, configured to analyze communication in the computer network, a gateway server to facilitate communication between the processor and external devices, at least one database, coupled to the processor, and configured to store at least one first communication rule, wherein the processor is configured to: receive a communication request, via the gateway server, between at least one device and the computer network, validate the at least one device based on the communication request and based on the at least one first communication rule, and restrict communication of devices with validated data to at least one virtual network within the computer network. In some embodiments, the at least one first communication rule may include device parameters for allowed connectivity.

In some embodiments, the processor may be further configured to assign communication permissions to each validated device, and wherein the communication of devices is restricted in accordance with the assigned communication permissions. In some embodiments, communication between devices assigned to different virtual networks is based on restrictive firewall rules. In some embodiments, the processor may be further configured to automatically generate the at least one virtual network within the computer network based on the assigned communication permissions.

In some embodiments, the at least one database may be configured to store at least one second communication rule, and wherein the processor is further configured to: identify the model of the at least one device, and restrict communication of devices with validated identification data to at least one virtual network within the computer network based on at least one second communication rule, wherein the at least one second communication rule may include model parameters for allowed connectivity.

In some embodiments, the processor may be further configured to restrict each new device to a dedicated virtual network until the new device is validated. In some embodiments, the at least one first communication rule may include parameters for allowed connectivity selected from the group consisting of: device model, device manufacturer, firmware version and media access control (MAC) address. In some embodiments, the at least one processor may be external to the computer network.

There is thus provided, in accordance with some embodiments of the invention, a non-transitory computer readable medium including instructions which, when implemented in a processor in a computer system cause the processor to: receive a communication request, via the gateway server, between at least one device and the computer network, validate the at least one device based on the communication request and based on the at least one first communication rule, and restrict communication of devices with validated data to at least one virtual network within the computer network.

In some embodiments, the processor may be further configured to assign communication permissions to each validated device, wherein the communication of devices is restricted in accordance with the assigned communication permissions. In some embodiments, the processor is further configured to: identify the model of the at least one device, and restrict communication of devices with validated identification data to at least one virtual network within the computer network based on at least one second communication rule, wherein the at least one second communication rule may include model parameters for allowed connectivity.

In some embodiments, the at least one second communication rule may include parameters for allowed connectivity selected from the group consisting of: device model, device manufacturer, firmware version and media access control (MAC) address. In some embodiments, the processor may be further configured to restrict each new device to a dedicated virtual network until the new device is validated.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

According to some embodiments, methods and systems are provided for automatic segmentation of computer home networks, with automatic identification and/or assignment of computerized devices to the correct segment based on their security attributes. Segments may be dynamically configured, with a drag-and-drop interface, for instance suitable for non-technical users. In some embodiments, types of network connected devices may be determined (e.g., detecting manufacturer or software version) using a combination of active and passive scans, router provided information and/or an identification cloud infrastructure.

Figure 1:
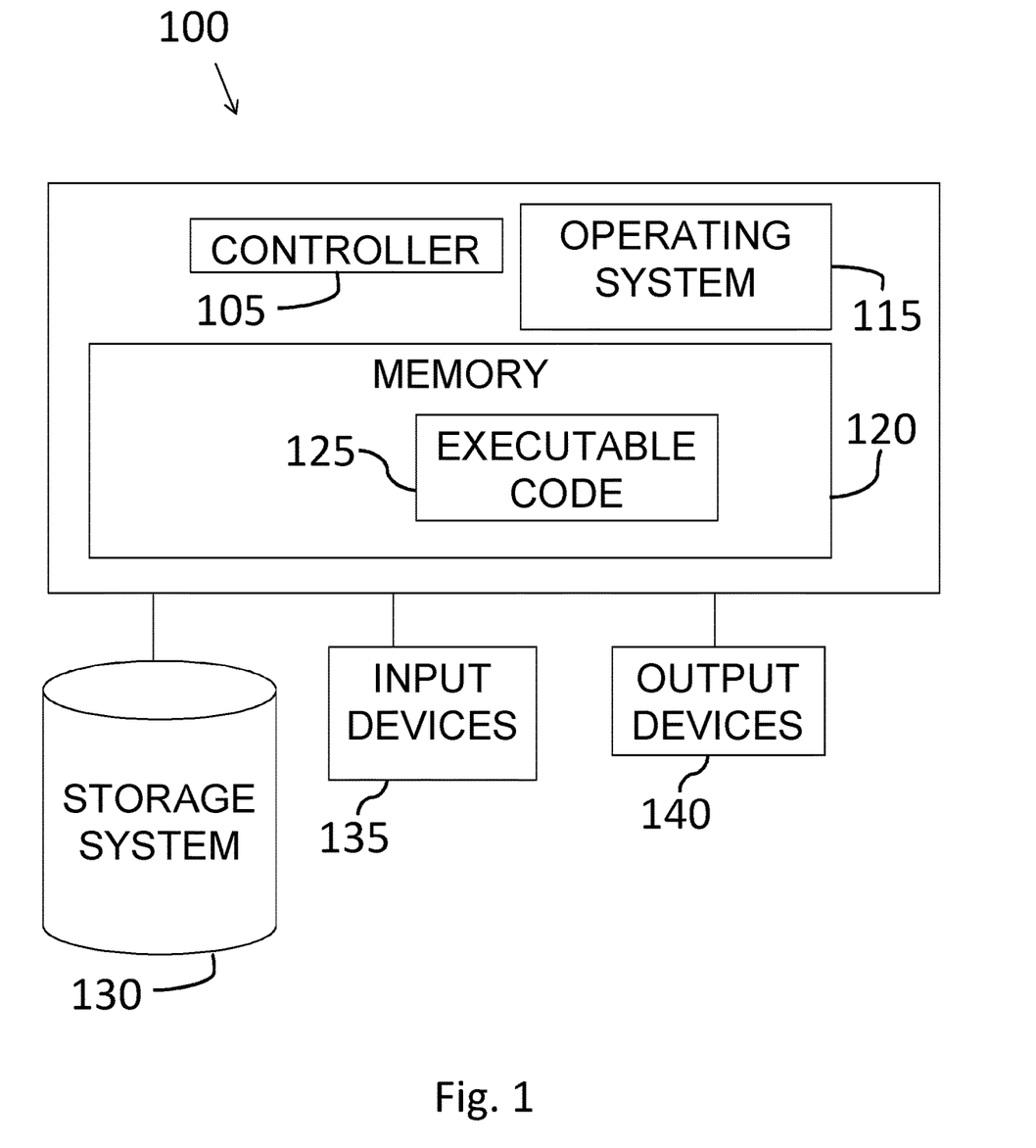
FIG. 1 shows a block diagram of an examplary computing device, according to some embodiments of the invention.
Figure 2A:
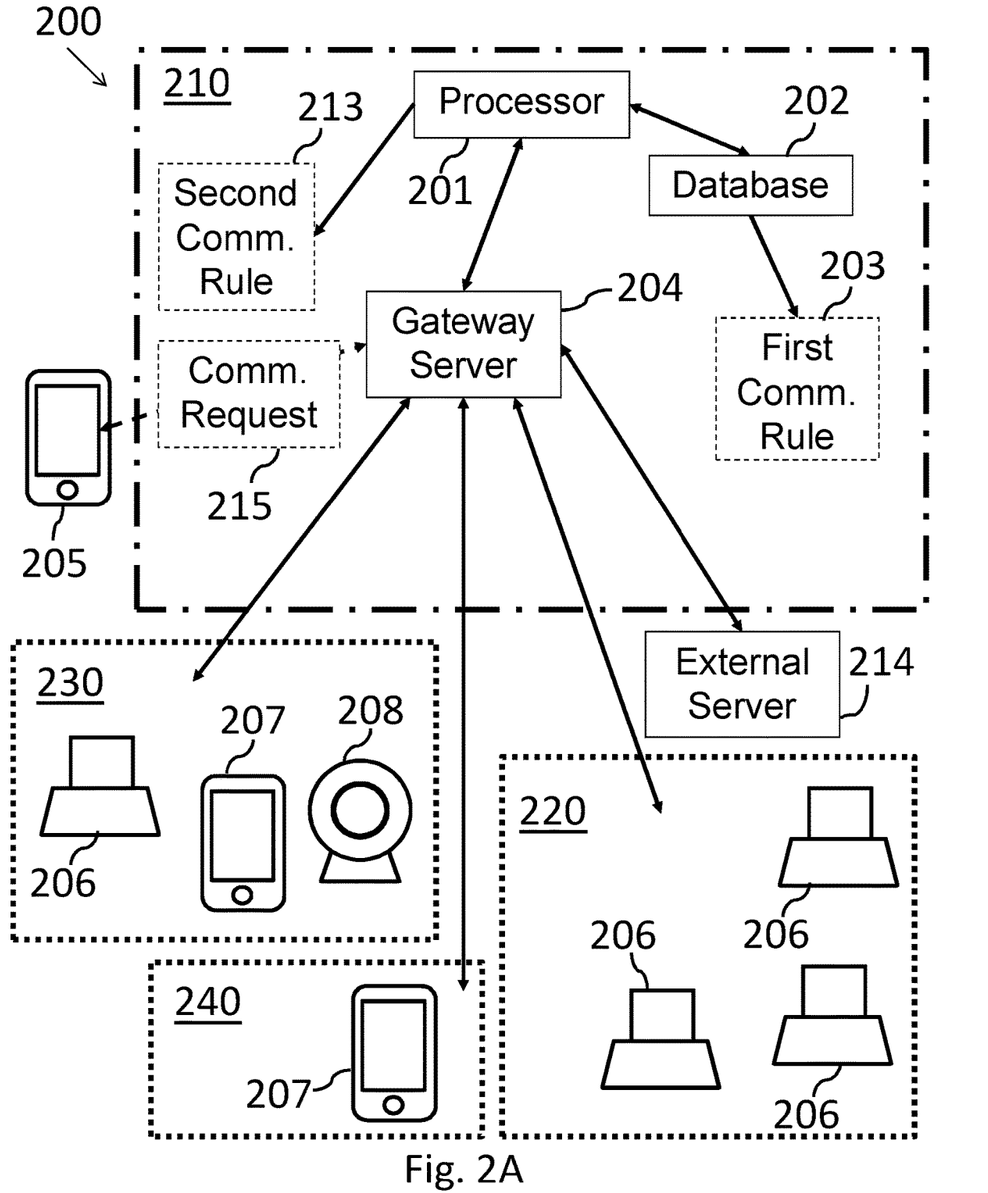
FIG. 2A shows a block diagram of a system for management of communication between devices in a computer network, according to some embodiments of the invention.
Figure 2B:
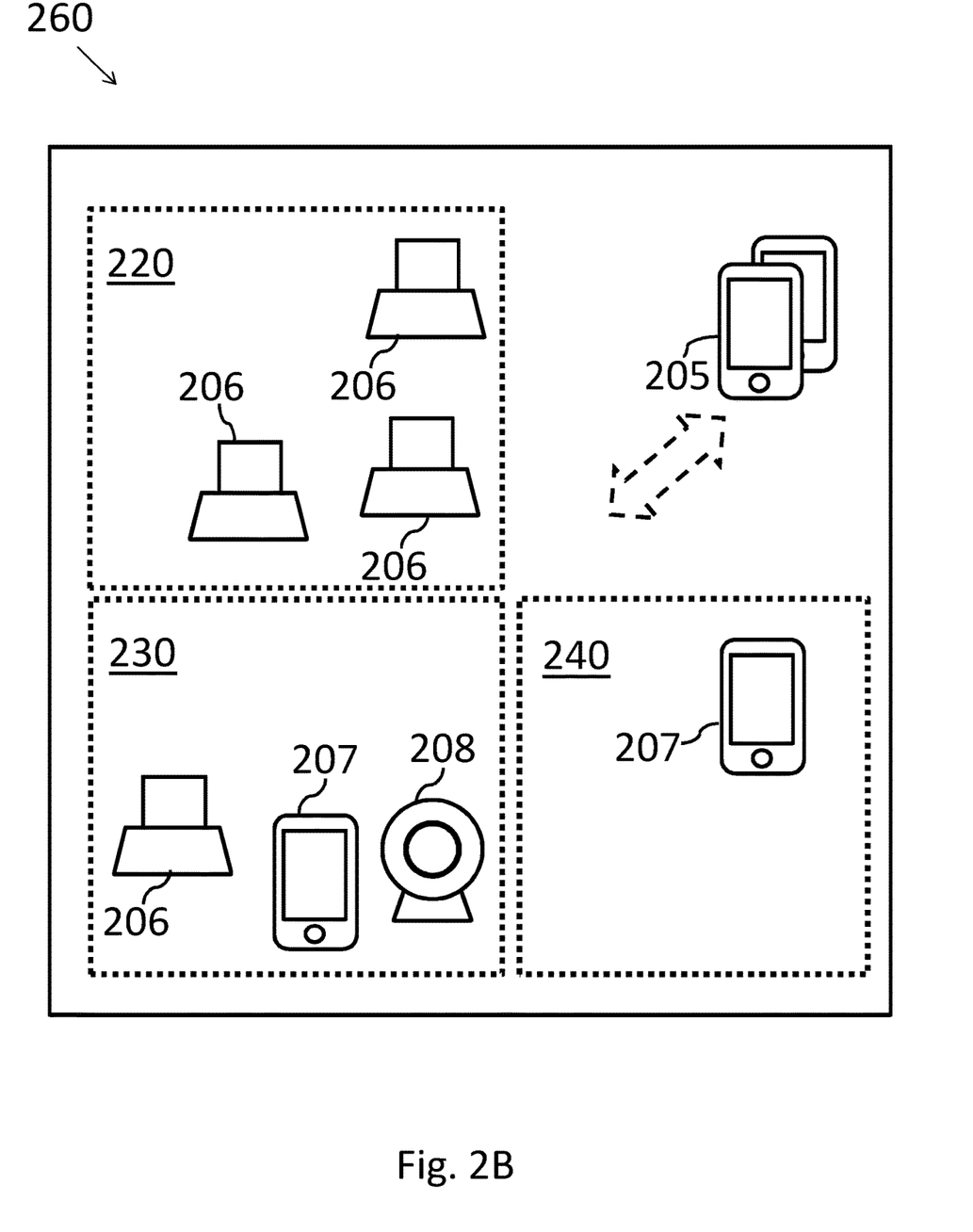
FIG. 2B shows a user interface for the system for management of communication between devices, according to some embodiments of the invention.

Reference is made to FIG. 1, which shows a block diagram of an examplary computing device, according to some embodiments of the invention. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, devices, etc. More than one computing device 100 may be included in, and one or more computing devices 100 may act as the components of, a system according to embodiments of the invention. The computing device or controller of FIG. 1 may act as the various computing devices or controllers of FIG. 2, e.g. the devices communicating on a network, such as smart watches, etc. or a processor receiving a communication request, etc.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA) and/or system on a chip (SOC) that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein, or act as the "devices" described herein, or perform other functions.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor to carry out methods disclosed herein. For example, a storage medium such as memory 120, may include computer-executable instructions such as executable code 125 and a controller such as controller 105 may execute these instructions or executable code 125.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of chips, FPGAs or SOCs, a plurality of computer or network devices, or any other suitable computing device. For example, a system as described herein may include one or more devices such as the computing device 100.

Reference is made to FIG. 2A which shows a block diagram of a system 200 for management of communication between devices in a computer network 210, according to some embodiments of the invention. The direction of arrows in FIG. 2A may indicate the direction of information flow.

In some embodiments, system 200 may include a processor 201 of the computer network 210 (for instance, processor 201 may be embedded in a computer/server/router such as computerized device 100 shown in FIG. 1) and at least one database 202, coupled to processor 201, to store predetermined communication rules such as at least one first communication rule 203 (for instance a communication rule to determine which device is allowed to connect to which network) and/or at least one second communication rule 213 (for instance a restrictive communication rule to determine by the processor which device type is restricted by the processor and/or gateway to communicate with which network and/or device). The at least one first communication rule 203 may for example indicate that upon detection of a MAC address (e.g., in a communication address) not known and/or not registered with processor 201, the device associated with that MAC address may be blocked. The at least one second communication rule 213 may indicate that upon detection of a predetermined device type (e.g., an "Apple TV"), that device may be restricted to at least one predetermined virtual network (e.g., a predefined 'Home' network). System 200 may include a communication module such as a gateway server 204 to facilitate communication between the processor 201 and external devices 205 (e.g., smartphones or internet of things (IoT) devices). The gateway server 204 may allow Internet, Wi-Fi and/or Ethernet connectivity to different devices in the computer network 210. Once an external device 205 is validated and allowed by processor 201 to communicate with the computer network 210, the validated device 206, 207, 208 may be assigned to at least one virtual network of computer network 210.

In some embodiments, processor 201 (e.g. including or associated with components as shown in FIG. 1) may be configured to receive communication requests 215 (e.g. via the gateway server 204) between at least one external device 205 and the computer network 210, for instance when a new external device (e.g., a smart watch new to system 200 that is not previously registered and/or identified by processor 201) tries to connect to a home network and initially sends a communication request 215 to the gateway. For example, communication request 215 packet may be sent in TCP protocol from at least one external device 205 to the gateway server 204, with the communication request 215 packet including identification data (e.g., MAC address) of the sending device 205.

Processor 201 may analyze the received communication request 215 and identify that at least one external device 205 (e.g., a laptop) is trying to connect to computer network 210. For example, a particular device may be identified in a home network as the homeowner's device (e.g., a smartphone) based on its media access control (MAC) address as a unique identifier. Processor 201 may validate identification data of the at least one external device 205 corresponding to the communication request 215, such as the MAC address, and based on the at least one predetermined first communication rule 203, for instance validate that the MAC address of the newly connected device is previously known and accordingly assigned to at least one virtual network. Processor 201 may check or verify the identification data of the at least one external device 205 (e.g., check the identify MAC address) to determine if that data is already registered, for instance check if the MAC address is stored in database 202. If the identification data is validated (e.g., the MAC address is previously known to the network) the corresponding at least one external device 205 may be assigned to at least one predetermined virtual network. In some embodiments, validated data may refer to any data related to a device that has been successfully associated with a validated MAC address, for instance that is previously known to the network. Validation of devices may in some embodiments refer to checking if identification data associated with that device is valid (e.g., check that the MAC address is previously known to the network). If the identification data is not validated (e.g., the MAC address is unknown to the network) the corresponding at least one external device 205 may be assigned to a default virtual network (e.g., assigned to a 'blocked devices' network) for further analysis.

Once an external device 205 is validated by processor 201, that device may communicate within the network with other devices and/or with the processor 201, via the gateway server 204. In some embodiments, the at least one first communication rule 203 may include parameters for allowed connectivity for example including device model, device manufacturer, firmware version and MAC address.

Processor 201 may update a table, for instance stored at database 202, of connected devices within the network each time a device is added to or removed from the computer network 210. In some embodiments, processor 201 may store predefined connectivity configurations, for instance stored at database 202, for each device and apply these configurations for each newly added device accordingly (e.g., smart watches may be configured to access all networks operated by processor 201).

According to some embodiments, processor 201 may assign communication permissions to each validated device 206, 207, 208, and restrict communication of devices with validated identification data to at least one virtual network 220, 230, 240 within the computer network 210 in accordance with the assigned communication permissions. For example, device 207 may receive permission (e.g., a permission may correspond to compatible configuration for network connectivity such as allowed MAC to communicate with particular networks) to communicate with virtual network 230 and 240. In some embodiments, communication of validated devices within the computer network 210 may be restricted prior to the assignment of communication permissions. It should be noted that while three virtual networks 220, 230, 240 are shown in FIG. 2A, any other number of networks may be possible as the owner of computer network 210 may modify new virtual networks when required (for instance add a new virtual network for printers only). The virtual networks may be assigned for at least one of: a home network (e.g., for the main appliances such as the mobile device of the owner), an IoT network (e.g., for connected devices such as a connected vacuum cleaner or a smart TV), a guest network (e.g., for guest devices such as a smartphone of a friend occasionally visiting the network) and a blocked network (for devices that are not yet allowed to communicate with the network). Devices in such different zones or networks may only communicate with each other based on restrictive firewall rules (e.g., such as at least one second communication rule 213).

According to some embodiments, in addition to validation of the external devices 205, processor 201 may identify a model of the device. For example, processor 201 may identify that a device 205 sending a connection request 215 is a smartphone of a model "iPhone", for instance based on further analysis of captured communication data, and processor 201 may accordingly apply at least one second communication rule 213 to determine if "iPhone" type smartphones are allowed to communicate within computer network 210 (e.g., within a "guest" network). Processor 201 may restrict connectivity of devices of certain models to specific at least one virtual network 220, 230, 240 based for example on their model, trade name, etc. according to predetermined configurations (e.g., stored at database 202).

For example, a first virtual network 220 may be defined as a 'home' network for devices 206 that are operating only within the computer network 210, such as PCs, printers, smart TVs, etc. A second virtual network 230 may be defined as a 'guest' network for devices 207 that are occasionally operating within the computer network 210 (such as smartphones or laptops), or an 'IoT network for internet of things (IoT) devices 208 (e.g., a webcam), where all virtual network may communicate via gateway server 204. Devices in the 'guest' network may get Internet access but will not be able to communicate with devices in the 'home' network, such that security breaches from guest devices may be prevented in advance.

According to some embodiments, some virtual networks may be configured to allow communication between connected devices within the virtual network. Some virtual networks may not allow such communication, and each device may be completely isolated from the others (for example in the 'guest' network).

A third virtual network 240 may be defined as a 'temporarily blocked' network for blocked devices that failed identification and/or validation by processor 201, for example a device operated by neighbor trying to connect to a different home network may be blocked. In some embodiments, blocked devices may remain in the third virtual network 240 until the identification process is successful and/or until the device is validated by processor 201. In some embodiments, all new devices requesting to connect with computer network 210 may be temporarily restricted to the 'temporarily blocked' third virtual network 240 until validated (e.g., having identification data recognized by processor 201). For example, a new device 205 (e.g., having a MAC address not detected previously) may send a new connection request 215 to the computer network 210, via the gateway server 204. This unknown device 205 may be temporarily associated with the 'temporarily blocked' third virtual network 240. The homeowner may get a notification, for example via a mobile app, to confirm or deny the connection for the new device 205. When confirmed, the device 205 may be delegated access to a 'guest' virtual network or zone as a new allowed device. If the device is not confirmed, that device 205 may remain blocked and/or disconnected from the computer network 210, according to the homeowner's decision.

In some embodiments, devices 206, 207, 208 that are assigned to different virtual networks 220, 230, 240 may communicate with each other based on restrictive firewall rules or security policies, for instance based on the at least one predetermined first communication rule 203. In some embodiments, at least one predetermined first communication rule 203 may include cross-network communication rules with restrictions for communication between different virtual networks 220, 230, 240.

In some embodiments, the processor 201 may be configured to automatically generate the at least one virtual network 220, 230, 240 within the computer network 210 based on the assigned communication permissions (e.g., automatically generate a new virtual network when new a printer or smart TV is connected). For example, processor 201 may execute an algorithm to automatically generate IP configurations of a new virtual network 220, 230, 240 within the computer network 210. In some embodiments, the processor may be configured to restrict and/or block communication to the computer network 210 of devices with non-validated identification data (e.g., based on an invalid MAC address).

According to some embodiments, if a network attack is detected emerging from one of the devices requesting communication, that device may be automatically moved to a 'blocked' virtual network for a predetermined amount of time (e.g., an hour), in order to prevent further attacks.

According to some embodiments, at least one external device 205 attempting to connect to computer network 210 may be automatically identified, for instance identifying device's model, manufacturer and/or firmware version and assigning the it to the appropriate virtual network 220, 230, 240 in accordance with the at least one second rule 213, such that the owner of computer network 210 (e.g., user of a home computer network) may no longer be required to manually configure devices and networks. It should be noted that in contrast to some current solutions where a guest user with an external device 205 wishing to communicate with computer network 210 is required to reconnect each time and provide a dedicated password, system 200 may allow the owner of computer network 210 to easily automatically reassign devices between the defined virtual networks 220, 230, 240.

In some embodiments, determination of devices identity and/or type may be performed on an external processor and/or server, for instance external to computer network 210, such that processing power within computer network 210 is not increased.

In some embodiments, assignment of devices to the appropriate virtual network 220, 230, 240 may be independent of the type of connection of the device (e.g., regardless of the physical location and/or physical connection type such as Ethernet or wireless), thereby reducing the amount of required configuration and eliminate physical aspects of the computer network 210.

According to some embodiments, system 200 may allow identification of the connection and disconnection of devices in the computer network 210, regardless of the connection method (Wi-Fi, Ethernet), and instantly notify the owner of computer network 210 thus allowing quick response to non-legitimate devices connecting to the network. For example, issuing an alert for the owner of computer network 210 when a device connects to or disconnects from the computer network 21, e.g. a family member entered the house and so their smartphone connected to the Wi-Fi network, or alerting that the owner's password is compromised and that someone has joined the network. In another example, issuing an alert for the owner of computer network 210 when devices in different virtual networks try to communicate with each other (e.g., a laptop got hacked and now a virus tries to break into the smart cameras).

In some embodiments, system 200 may allow collection of captured data from various devices (e.g., from smartphones, IP cameras, etc.) and correlating the collected data with information provided from the gateway server 204 (e.g. a router), such that identification of new external devices 205 may be improved with time as additional device identification data is added to the database (e.g., using supervised or unsupervised machine learning algorithms). The system 200 may allow automatic mapping and/or full identification of existing network topologies, for instance identifying repeaters extending the signal within the computer network 210 and identification of devices connected to those repeaters or allowing identification of devices connected behind other networking appliances. Thus, even devices not directly visible in the computer network 210 or not directly connected to the gateway server 204 may be properly secured. In some embodiments, a security policy may be accordingly applied for each device based on the prior identifications.

In some embodiments, basic identification may be initially provided in order to assign basic security policies and/or in order to supply fast information to the owner of computer network 210 for instance based on the at least one first communication rule 203, wherein full identification may be later improved as more data may be received (e.g., captured during communication) for instance based on the at least one second communication rule 213. For example, initially a smartphone may be identified as trying to connect and later identify the manufacturer and operating system of the device (e.g., an 'iPhone' model).

It should be noted that some operations that are described to be carried out by processor 201 may also be implemented on existing gateway servers 204 without additional manual configuration and/or installation, such that no device is left undetected as all traffic may be routed via the gateway 204.

Reference is made to FIG. 2B which shows a user interface 260 for system 200, according to some embodiments of the invention. Processor 201 may be configured to generate a user interface 260 with a draggable (e.g. by a user using a pointing device) icon or symbol for each device 205, 206, 207, 208 assigned to at least one virtual network 220, 230, 240 within the computer network 210, and wherein dragging an icon to a different area in the user interface may cause automatic reassignment of that device 206, 207, 208 to a different virtual network 220, 230, 240. Thus, the owner of the computer network 210 may easily reassign each device 206, 207, 208 to a different virtual network 220, 230, 240 such that there is no longer a need to perform technical configurations with command line interfaces and/or poorly accessible web interfaces. For example, upon receiving a communication request 215 from an external device 205 the owner of computer network 210 may drag the corresponding icon to the desired network (e.g., to virtual network 230) and thereby automatically redefine the communication permissions for the external device 205, for instance without the need to manually configure corresponding IP and/or MAC addresses.

The user interface 260 may display which devices are connected, what is their identified model, and what is their IP and MAC addresses. In some embodiments, a relevant image (e.g., an icon of a printer for printers or an icon of a smartphone for smartphones) may be displayed according to the device model, to help the user associate the device presented to the one installed in the network.

In some embodiments, the displayed data may include information for which devices are connected to the computer network, what is their identified model, and/or what is their IP and/or MAC addresses. A relevant image may be displayed according to the devices' model, in order to help the user or owner of the computer network to associate the displayed devices to those previously installed in the house.

Figure 3:
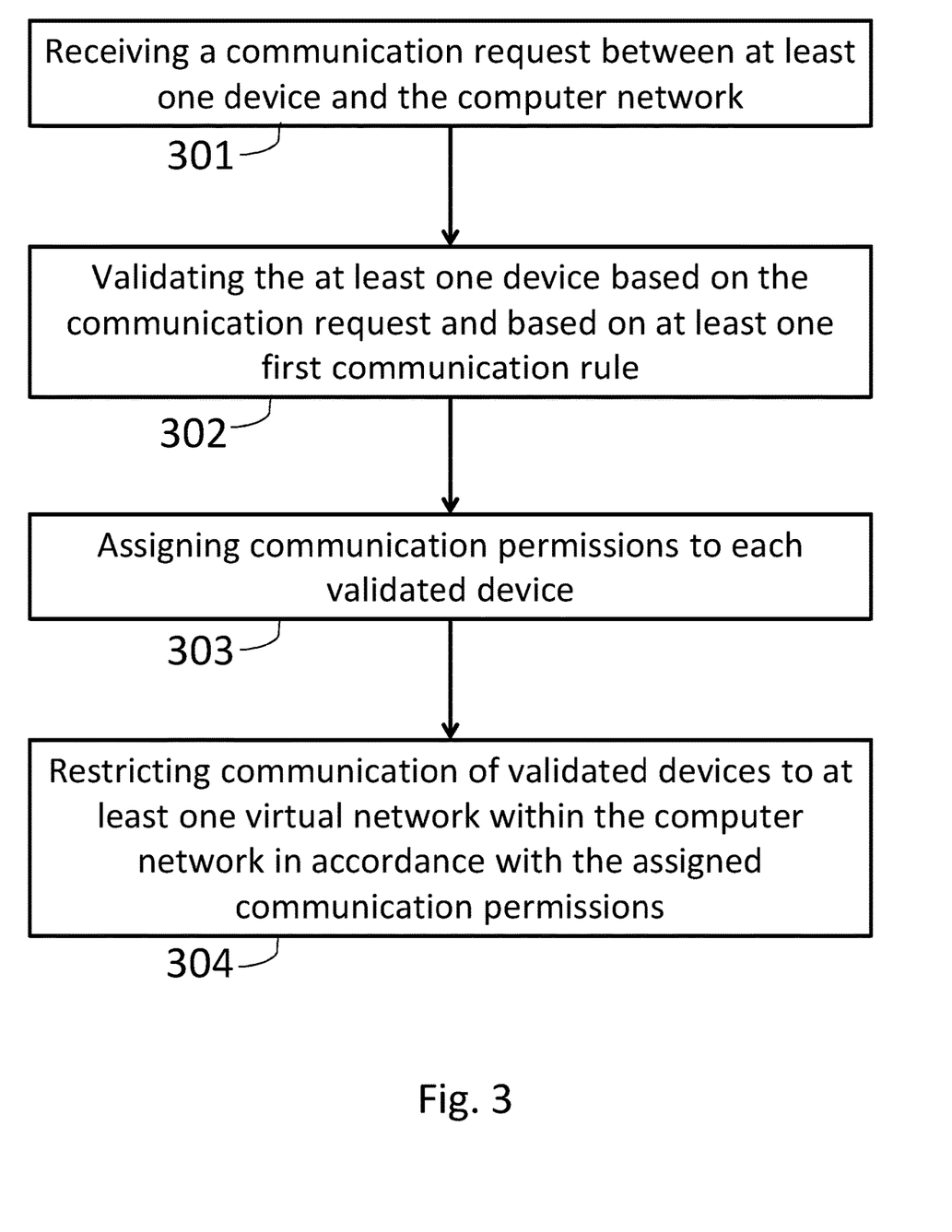
FIG. 3 shows a flowchart for a method of managing communication between devices in a computer network, according to some embodiments of the invention.

Reference is made to FIG. 3 which shows a flowchart for a method of managing communication between devices in a computer network, according to some embodiments of the invention. The operations in FIG. 3 may be used with systems as shown in FIGS. 1 and 2, but may be used with other systems.

A processor (e.g. processor 201) may receive 301 a communication request between at least one device 205 and the computer network 210, and validate 302 identification data (e.g., basic information such as IP and/or MAC addresses) of at least one device corresponding to the communication request and based on at least one predetermined first communication rule 203. The at least one first communication rule 203 may include device parameters (e.g., MAC address) for allowed connectivity, for example if processor 201 determined as a validated (e.g. previously known) MAC address, the device associated with that MAC address may be allowed to connect and/or communicate with the computer network 210.

In some embodiments, the processor 201 may assign 303 communication permissions to each validated device, and restrict 304 communication of devices with validated identification data to at least one virtual network 220, 230, 240 within the computer network 210 in accordance with the assigned communication permissions. Assigning communication permissions to each validated device may include configuration (e.g., by processor 201) of existing virtual networks to communicate or block the specific identification data (e.g., MAC address) of the validated device such that the validated device may only communicate with those virtual networks configured for allowed communication (e.g., configuring only the 'Guest' network to communicate with a new device). Database 202 may store communication permissions and compatible network configurations that are associated with various devices, such that for a specific validated device the corresponding communication permissions (and configurations) may be retrieved. In some embodiments, the at least one virtual network may be automatically generated based on the assigned communication permissions.

According to some embodiments, system 200 may detect network connected devices including details such as model, the specific type, manufacturer and/or software version using a combination of active and passive scans, router provided information, identification of cloud infrastructure, and/or by leveraging existing low-end equipment and accordingly assign the device to the appropriate network based on the at least one predetermined second communication rule 203.

Figure 4:
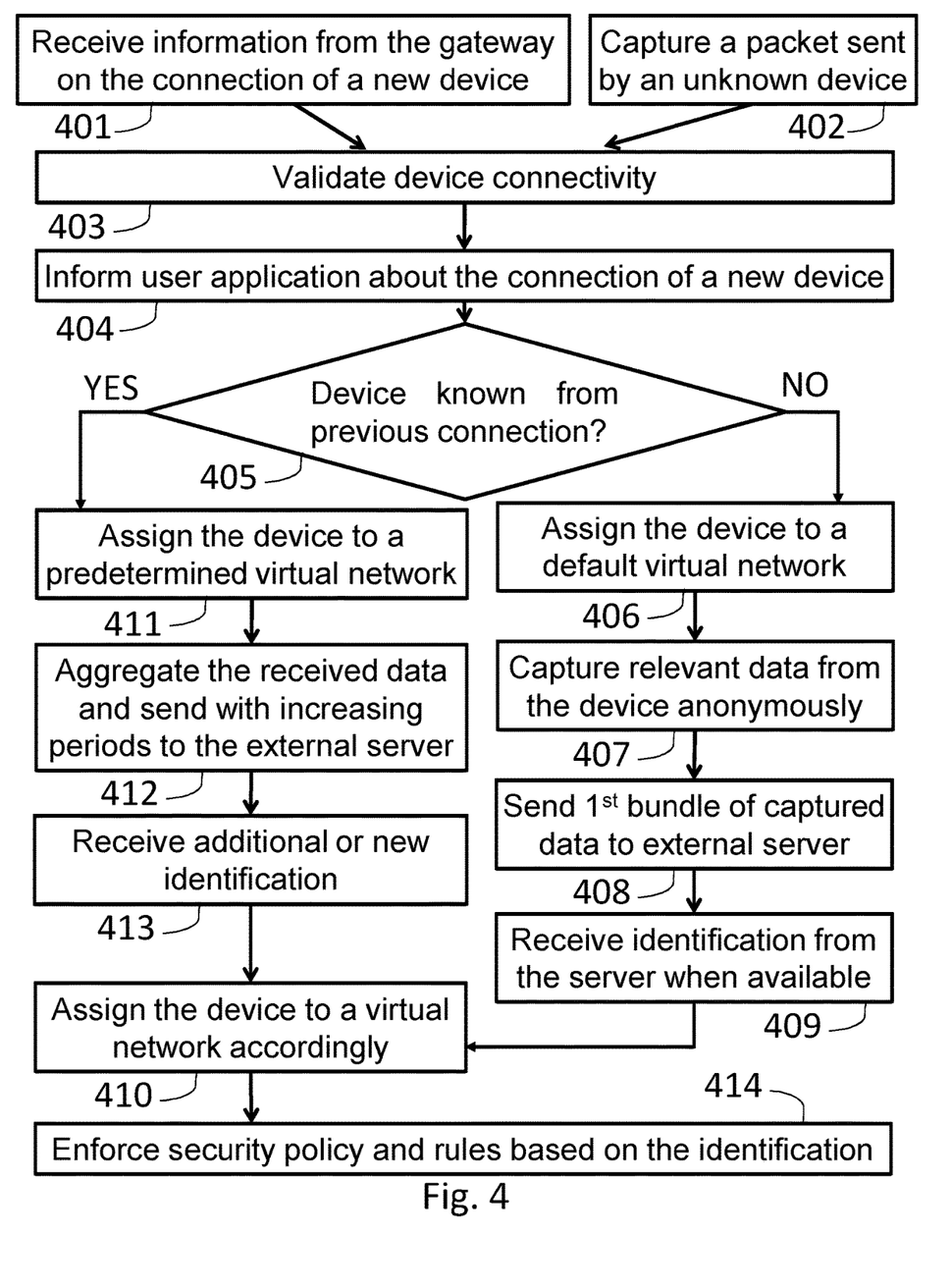
FIG. 4 shows a flowchart for a method of identifying devices in a computer network, according to some embodiments of the invention.

Reference is made to FIG. 4 which shows a flowchart for a method of identifying devices in a computer network, according to some embodiments of the invention. The operations in FIG. 4 may be used with systems as shown in FIGS. 1 and 2, but may be used with other systems.

An example identification process may be initiated by receiving 401 information from the gateway server 204 on the connection request of a new device 205, and/or detecting or capturing 402 an address resolution protocol (ARP) packet and/or dynamic host configuration protocol (DHCP) packet that is received from a previously unknown entity or external device 205 in the computer network 210. In some embodiments, the identification process or device connectivity may be validated 403 by the processor 201 via the gateway server 204 issuing a notification 404 about the connection attempt of a new device 205, via various methods (e.g., ARP). The validation 403 of the device connectivity to the network may be asserted by actively sending an ARP ping packet to the device 205, and since the ARP ping packet is known to not cause any network side effects and is reliable in determining the device connectivity, the owner of the computer network 210 may be informed 404 (e.g., via a mobile application or via email notification) about the connection of a new device to the computer network 210. After the user is notified 404 of a new connection request 215, the processor 201 may check 405 if the device 205 is known from previous connections (e.g., compatible to at least one parameter stored at the database 202).

According to some embodiments, for previously unseen devices 205 (e.g., new), the identification process may start to determine the exact model of the device, for instance according to the at least one second communication rule 213. Relevant network information (e.g., the manufacturer) may be captured from the network, anonymized and sent in real time to an external server. The external server may process the data and send back an identification as soon as it is available.

According to some embodiments, identification of model parameters such as the IoT model, manufacturer, firmware version, etc. may also include identification of unpatched vulnerabilities on the device (e.g., based on its version). If such vulnerabilities are detected, an alert may be issued to the user to update that device. Devices with default credentials unchanged may also be detected by actively scanning, and issuing an alert to the user to change credentials and/or block access to that service of the device (e.g., telnet, secure shell (SSH), HTTP, etc.).

In case that the device 205 is not known, the processor 201 may assign 406 the device 205 to a default virtual network (e.g., to the "temporarily blocked" network). The processor 201 may capture 407 relevant data from the device anonymously, for instance capture DNS and/or DHCP and/or TCP initiation packets. In some embodiments, the processor 201 may send 408 a first bundle of anonymously captured data to an external processor and/or server 214 (e.g., as shown in FIG. 2B) for fast processing in order to quickly identify the device 205 and/or prevent overloading of the computation resources of the system. The processor 201 may receive 409 identification from the external processor and/or server 214 when available and accordingly assign 410 the device to at least one virtual network, for instance based on at least one first communication rule 203 and/or based on at least one second communication rule 213.

In case that the device 205 is known, the processor 201 may assign 411 the device 205 to a corresponding predefined virtual network (e.g., to the "home" network). The processor 201 may aggregate 412 additional received data (e.g., MAC address and/or operating system) and send, for instance with increased periods (e.g., starting from a predetermined time interval for data aggregation, and that interval may be increased according to a predefined function), to the external processor and/or server 214. The processor 201 may receive 413 additional and/or new device identification from the external processor and/or server 214 and accordingly assign 410 the device to at least one virtual network, for instance based on at least one first communication rule 203 and/or based on at least one second communication rule 213. Once a device is identified it may be assigned to the correct virtual network 220, 230, 240 and in some embodiments presented with more details to the end user including a relevant image (e.g., an icon) to help the user identify the device. In some embodiments, specific security rules for each device may then be downloaded and enforced on the gateway server 204. The identified device may be presented to the owner of the computer network, for instance it may be displayed on a dedicated mobile app. In some embodiments, the processor 201 may enforce 414 a security policy and/or rules based on the determined identification of the device. For example, restrict the connection of the device to specific virtual networks 220, 230, 240.

In case that the identification is not complete, more identification data may be collected. The data may be aggregated with increasing intervals in order to prevent overloading of the external server. Using new details (e.g., received from the external server), a more strict and appropriate security policy may be applied.

In case that the device connects to the computer network 210, and was previously identified, the previous identification may be used and that device may be accordingly assigned to the same virtual network as before. In some embodiments, additional data may be aggregated and sent to the server in order to receive a better identification, and to accommodate for possible changes in the device software version.

According to some embodiments, each device may be assigned additional user configurable security policy, for instance via a dedicated mobile app, such as parental control, limiting browsing times, safe search and safe browsing functionality. These configurations may be saved and whenever the device connects again to the computer network, the same configuration may be applied (e.g., by MAC address identification).

It should be noted that such fine-grained identification of devices may allow applying the strictest security policy for this specific device. It may also allow enforcing only those security rules that are needed for this specific device, thus freeing up performance overhead from the gateway server. In some embodiments, system 200 may improve computer network technology and the technological problem of assigning devices to different networks by for example automatically identifying and assigning new devices to their correct or best suited virtual networks. This may free a network administrator from manual configuration for each device, which may require network understanding such as MAC addresses and network protocols. Moreover, in some enterprise networks, it may be necessary to repeat the same manual configurations multiple times on different types of switches and/or Wi-Fi access points. Embodiments of the invention may improve network technology by automatically identifying every device trying to communicate with a computer network.

Unless explicitly stated, the method embodiments described herein are not constrained to a particular order in time or chronological sequence. Additionally, some of the described method elements may be skipped, or they may be repeated, during a sequence of operations of a method.

Various embodiments have been presented. Each of these embodiments may of course include features from other embodiments presented, and embodiments not specifically described may include various features described herein.

The invention claimed is:

1. A method of securing data communication between devices in a computer network, the method comprising:
receiving, by at least one processor, a communication request between at least one device and the computer network;
identifying, by the at least one processor, a model of the at least one device;
validating, by the at least one processor, the at least one device based on the communication request, based on the identified model, and based on at least one first communication rule; and
restricting, by the at least one processor, communication of the at least one device to at least one virtual network within the computer network based on at least one second communication rule,
wherein the at least one first communication rule comprises device parameters for allowed connectivity, and wherein the at least one second communication rule comprises model parameters for allowed connectivity.

2. The method of claim 1, further comprising assigning communication permissions to each validated device, wherein the communication of devices is restricted in accordance with the assigned communication permissions.

3. The method of claim 2, wherein communication between devices assigned to different virtual networks is based on restrictive firewall rules.

4. The method of claim 2, further comprising automatically generating the at least one virtual network within the computer network based on the assigned communication permissions.

5. The method of claim 1, wherein the at least one second communication rule comprises parameters for allowed connectivity selected from the group consisting of: device model, device manufacturer, firmware version and media access control (MAC) address.

6. The method of claim 1, further comprising restricting each new device to a dedicated virtual network until the new device is validated.

7. The method of claim 1, further comprising detecting at least one of an address resolution protocol (ARP) packet and a dynamic host configuration protocol (DHCP) packet from the at least one device.

8. A system for securing data communication between devices in a computer network, the system comprising:
at least one processor, configured to analyze communication in the computer network;

a gateway server to facilitate communication between the processor and external devices;
at least one database, coupled to the processor, and configured to store at least one first communication rule,
wherein the processor is configured to:
receive a communication request, via the gateway server, between at least one device and the computer network;
identify a model of the at least one device;
validate the at least one device based on the communication request, based on the identified model, and based on the at least one first communication rule; and
restrict communication of the at least one device to at least one virtual network within the computer network based on at least one second communication rule,
wherein the at least one first communication rule comprises device parameters for allowed connectivity, and wherein the at least one second communication rule comprises model parameters for allowed connectivity.

9. The system of claim 8, wherein the processor is further configured to assign communication permissions to each validated device, and wherein the communication of devices is restricted in accordance with the assigned communication permissions.

10. The system of claim 9, wherein communication between devices assigned to different virtual networks is based on restrictive firewall rules.

11. The system of claim 9, wherein the processor is further configured to automatically generate the at least one virtual network within the computer network based on the assigned communication permissions.

12. The system of claim 8, wherein the processor is further configured to restrict each new device to a dedicated virtual network until the new device is validated.

13. The system of claim 8, wherein the at least one first communication rule comprises parameters for allowed connectivity selected from the group consisting of: device model, device manufacturer, firmware version and media access control (MAC) address.

14. The system of claim 8, wherein the at least one processor is external to the computer network.

15. A non-transitory computer readable medium comprising instructions which, when executed by a processor in a computer system cause the processor to:
receive a communication request, via a gateway server, between at least one device and a computer network;
identify a model of the at least one device;
validate the at least one device based on the communication request, based on the identified model, and based on the at least one first communication rule; and
restrict communication of the at least one device to at least one virtual network within the computer network based on at least one second communication rule, wherein the at least one first communication rule comprises device parameters for allowed connectivity, and wherein the at least one second communication rule comprises model parameters for allowed connectivity.

16. The non-transitory computer readable medium of claim 15, wherein the instructions when executed cause the processor to assign communication permissions to each validated device, wherein the communication of devices is restricted in accordance with the assigned communication permissions.

17. The non-transitory computer readable medium of claim 15, wherein the at least one second communication rule comprises parameters for allowed connectivity selected from the group consisting of: device model, device manufacturer, firmware version and media access control (MAC) address.

18. The non-transitory computer readable medium of claim 15, wherein the instructions when executed cause the processor to restrict each new device to a dedicated virtual network until the new device is validated.

19. The non-transitory computer readable medium of claim 15, wherein the processor is further configured to detect at least one of an address resolution protocol (ARP) packet and a dynamic host configuration protocol (DHCP) packet from the at least one device.

* * * * *